C. GITZENDANNER.
SIGNATURE GATHERING MACHINE.
APPLICATION FILED JAN. 18, 1919.

1,380,293.

Patented May 31, 1921.
9 SHEETS—SHEET 1.

INVENTOR.
Charles Gitzendanner
by Mauro Cameron
Lewis & Massie
ATTORNEYS.

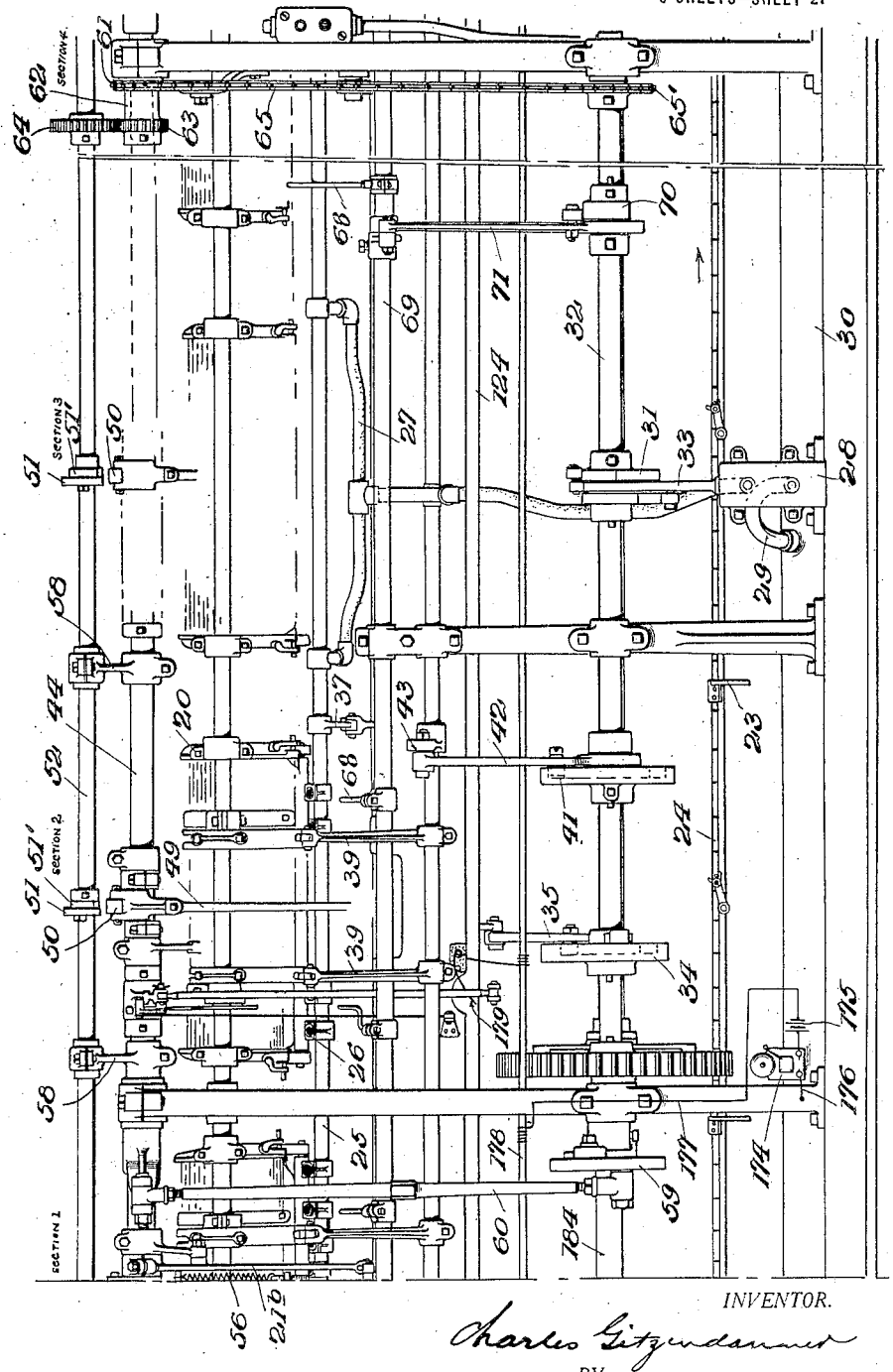

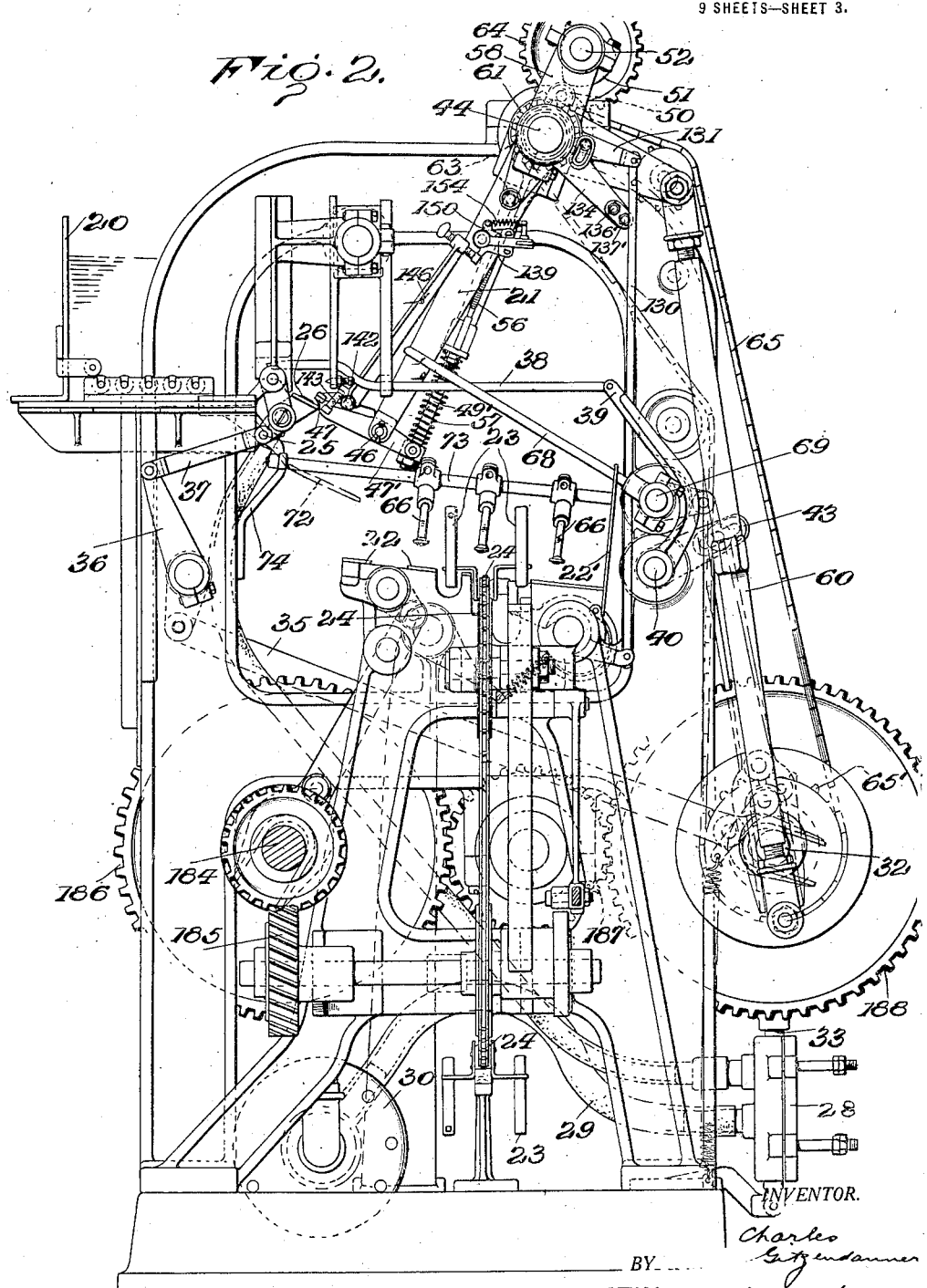

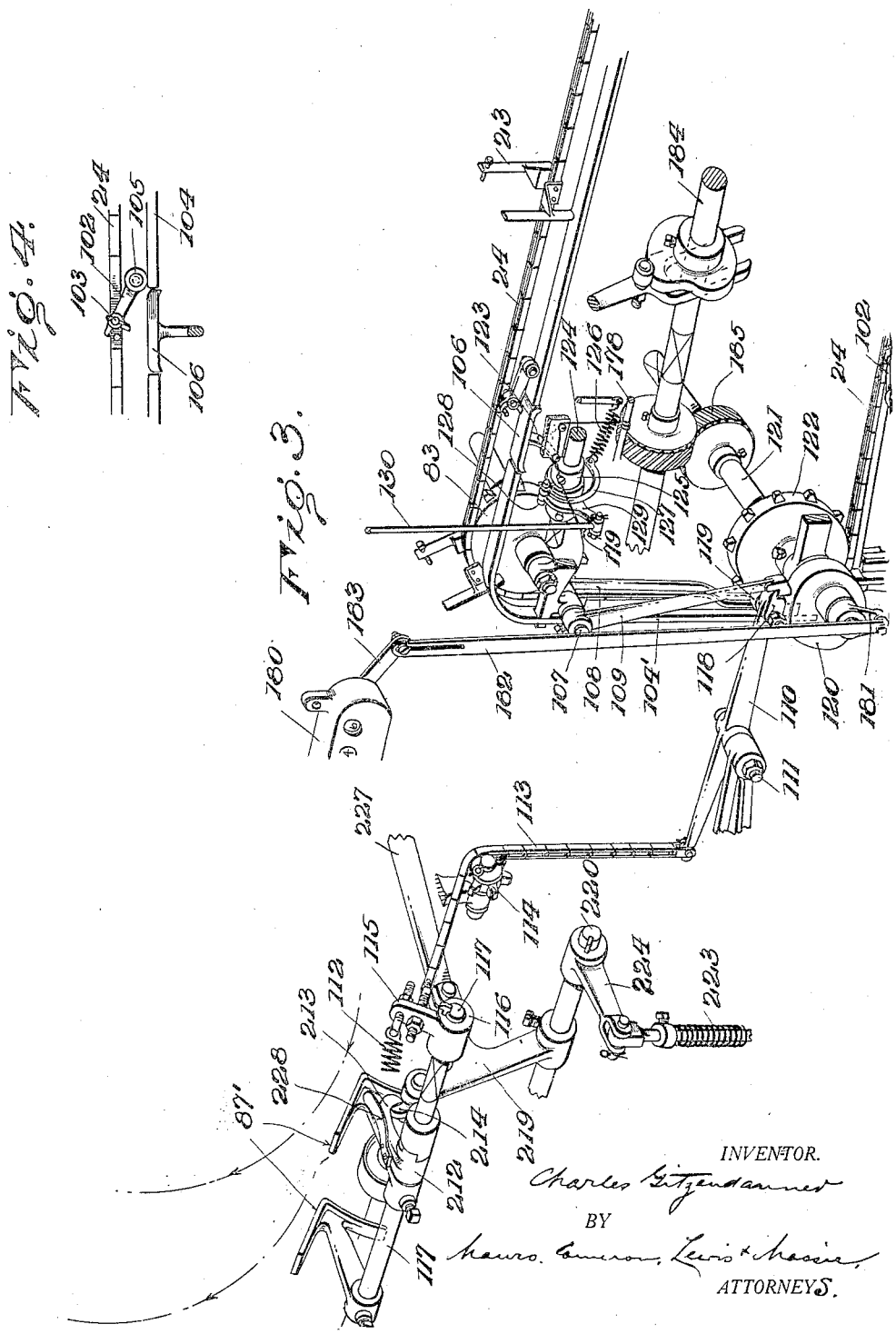

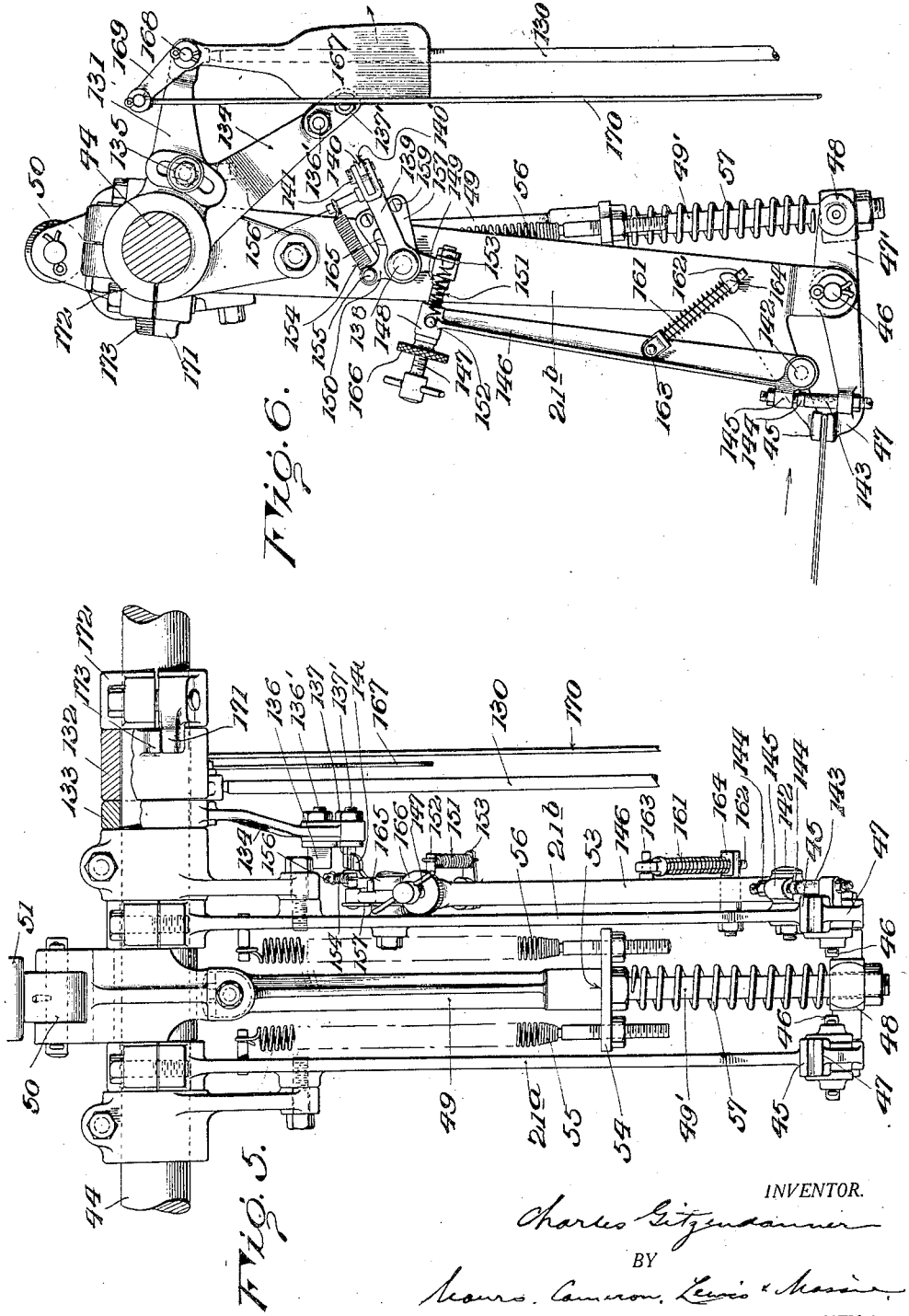

C. GITZENDANNER.
SIGNATURE GATHERING MACHINE.
APPLICATION FILED JAN. 18, 1919.
1,380,293.
Patented May 31, 1921.
9 SHEETS—SHEET 6.
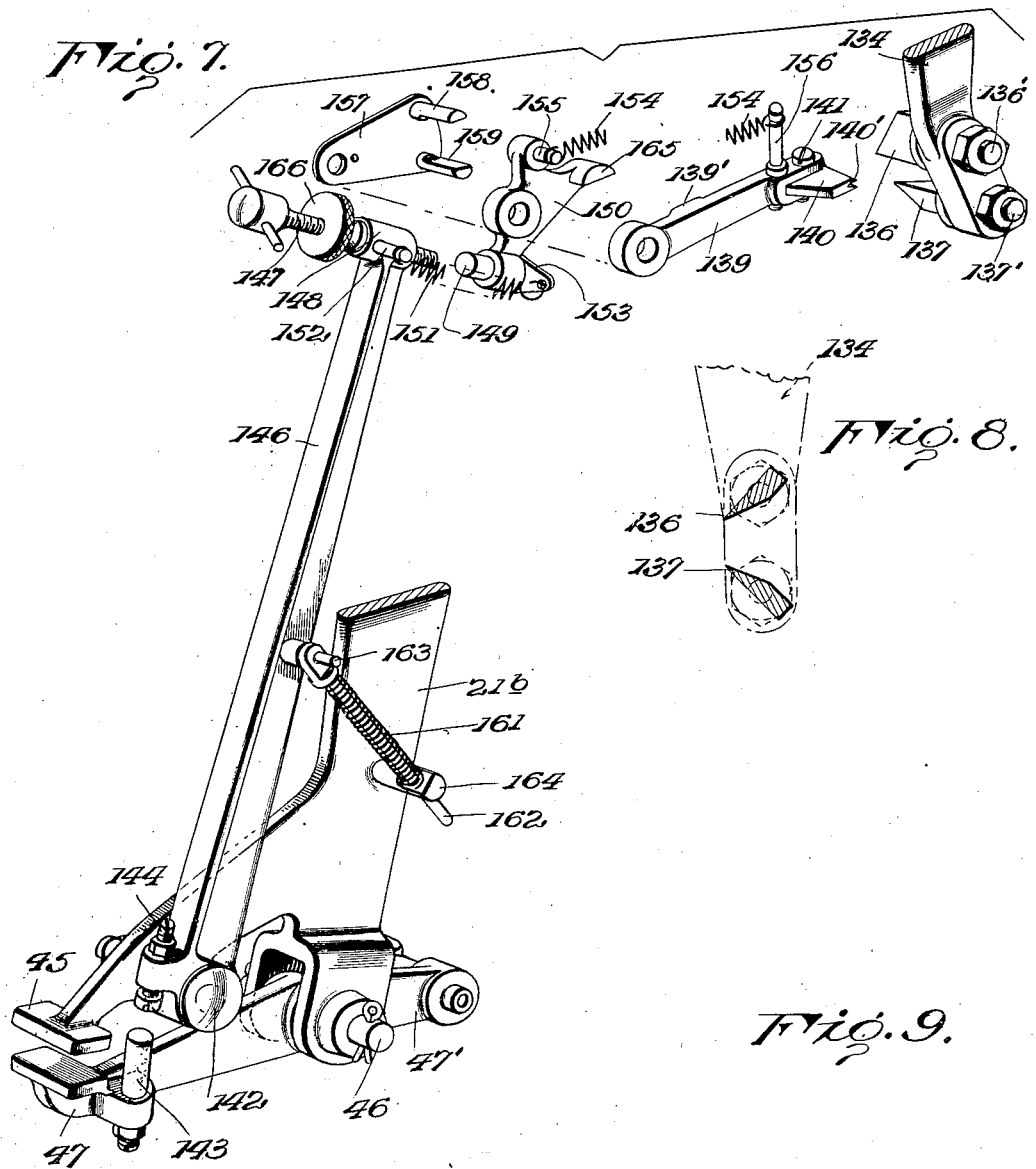
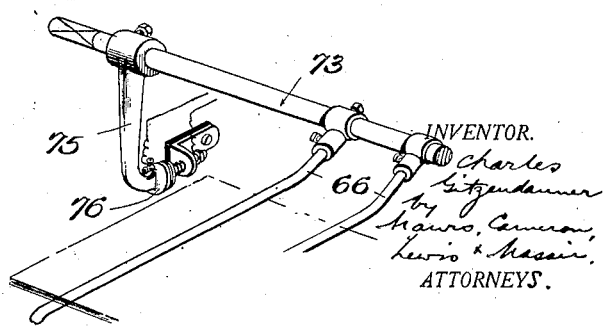
INVENTOR.
Charles Gitzendanner
by Mauro, Cameron,
Lewis & Massie.
ATTORNEYS.

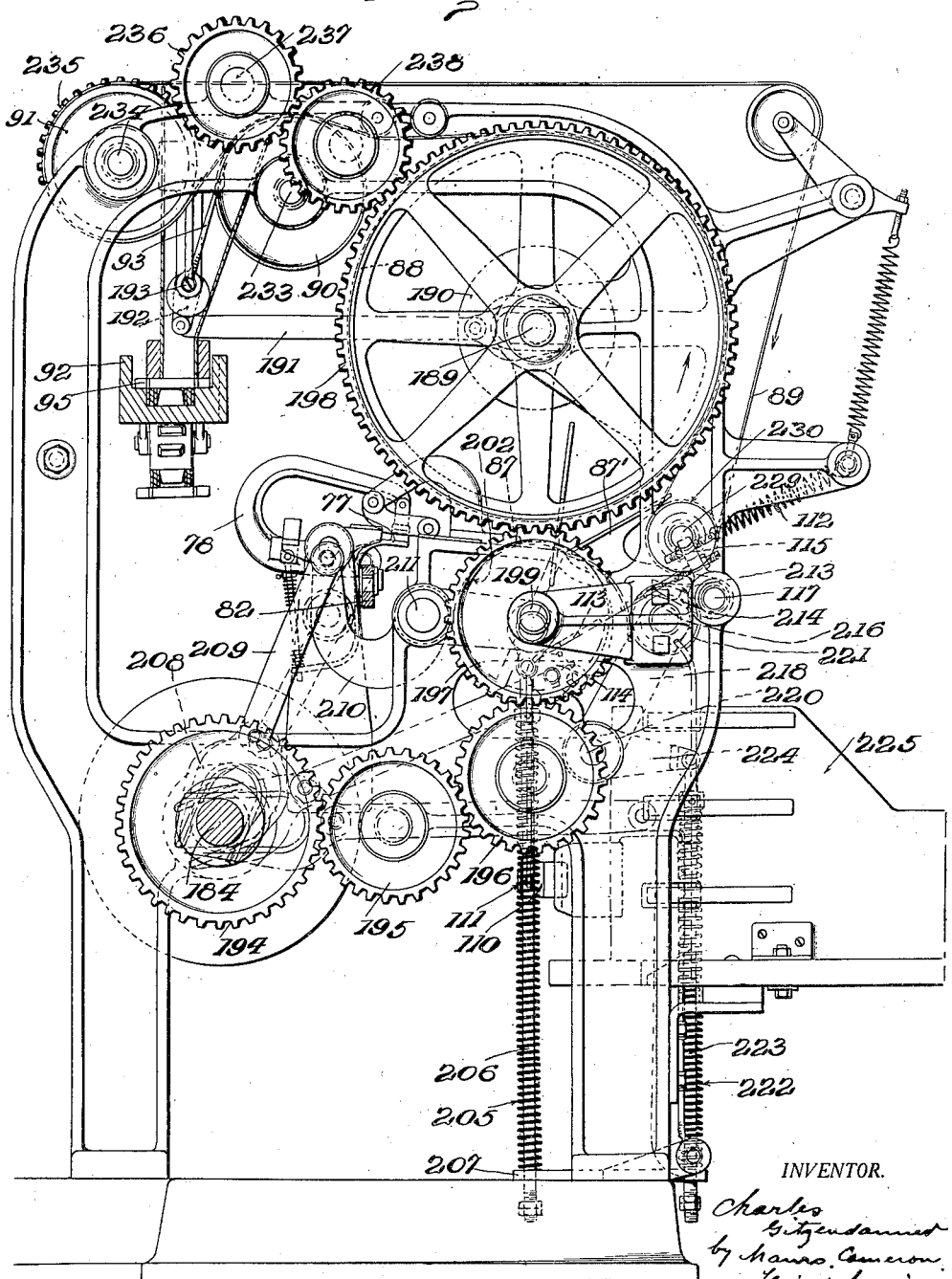

C. GITZENDANNER.
SIGNATURE GATHERING MACHINE.
APPLICATION FILED JAN. 18, 1919.

1,380,293.

Patented May 31, 1921.

C. GITZENDANNER.
SIGNATURE GATHERING MACHINE.
APPLICATION FILED JAN. 18, 1919.
1,380,293.
Patented May 31, 1921.
9 SHEETS—SHEET 9.
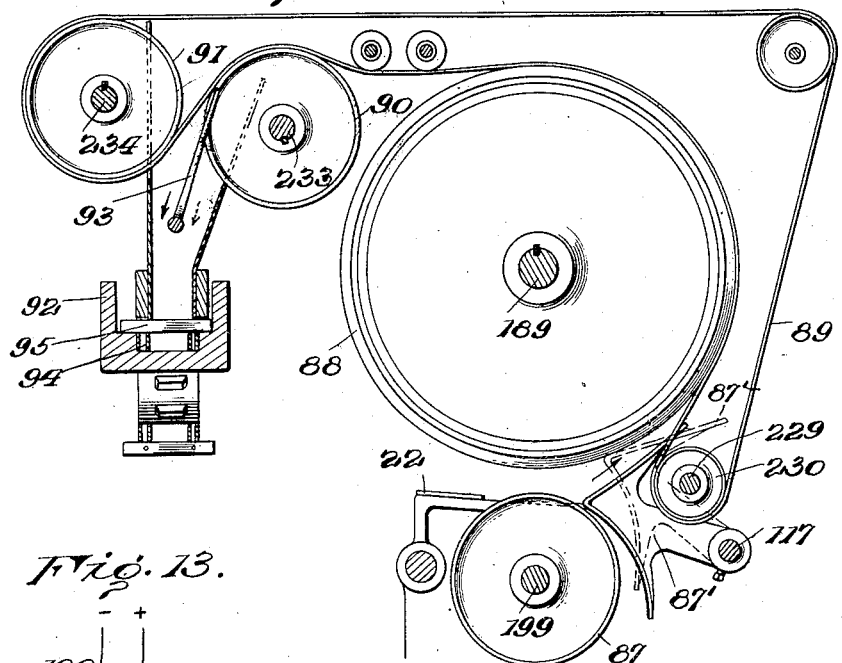
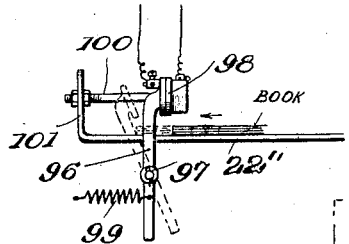
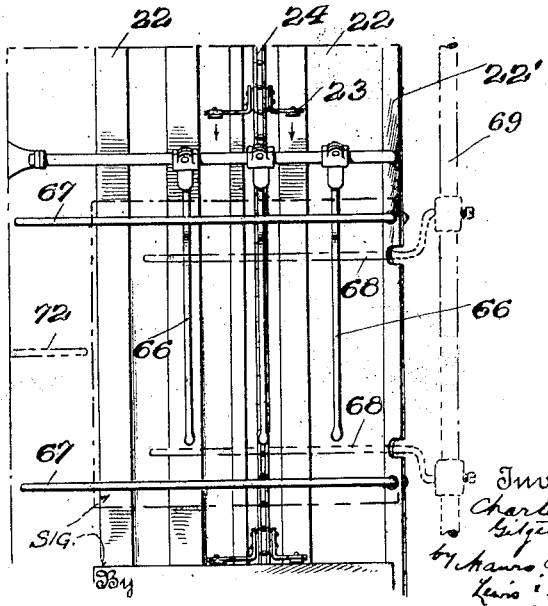
Inventor
Charles Gitzendanner
by Munn Cameron,
Lewis & Massie
Attorneys

UNITED STATES PATENT OFFICE.

CHARLES GITZENDANNER, OF BROOKLYN, NEW YORK, ASSIGNOR TO T. W. & C. B. SHERIDAN COMPANY, OF NEW YORK, N. Y., A CORPORATION OF NEW YORK.

SIGNATURE-GATHERING MACHINE.

1,380,293.      Specification of Letters Patent.      Patented May 31, 1921.

Application filed January 18, 1919. Serial No. 271,892.

*To all whom it may concern:*

Be it known that I, CHARLES GITZENDANNER, a citizen of the United States of America, and a resident of Brooklyn, New York, have invented a new and useful Improvement in Signature-Gathering Machines, which invention is fully set forth in the following specification.

The present invention is an improvement in sheet or signature gathering or assembling mechanisms, and the general object of the invention is to improve, simplify and render more efficient devices of this character.

The invention resides in numerous improvements which will hereinafter be described in detail. One of the principal features of the invention resides in improved means or connections for associating certain mechanisms for detecting the absence of signatures or imperfections in signatures (one such mechanism being associated with each source of sheet or signature supply) with means for automatically separating from the perfect books the "defective" signature groups; that is to say, signature groups that are short one or more signatures or into which an imperfect signature, or too many signatures, have entered.

No claim is made, broadly, to detecting mechanism in association with separating mechanism, as Dexter Patent No. 653,196, dated July 3, 1900, discloses the provision of detecting means at each sheet or signature source and trippers, carried by the main conveyer on which the signatures are gathered. These trippers are adapted to be set by said detecting means to operate a switch at an appropriate time to separate the defective signature groups from the good books. The Dexter detector means is of the well known "feeler" variety, as also employed in the Chambers machine (King Patent No. 1,041,806). King, like Dexter, utilized his detector means to separate the defective groups from the good books, using a compressed air system controlled by his detecting means to set stops or trippers which latter operate the switch.

The present invention, in one aspect, is an improvement on Dexter Patent No. 653,196, inasmuch as, like Dexter, I employ a detecting mechanism associated with each source of signature supply, a main conveyer for assembling the signatures into groups, trippers carried by said main conveyer and adapted to be set by said detecting means, and a switch or separating member, operated by said set tripper, for disposing of defective groups in a path separate from that of perfect books. I prefer, however, to employ detecting means of the well-known "calipering" variety, of the general type shown in Juengst Patent No. 761,496, instead of detecting means of the well-known "feeler" variety as employed by Dexter and King; and, in one aspect, the invention resides in the particular novel means which are employed in substituting the former for the latter and operating the separating mechanism therefrom.

In another aspect, the invention resides in improvements in the detecting mechanism, in the tripper mechanism, and in the particular means for rendering the tripper mechanism operative for actuating the switch or separating means.

The present invention embodies the well-known swinging gripper type of mechanism for withdrawing signatures from the various signature sources, in connection with which it has heretofore been experienced that a part of the signature, after it is withdrawn from the hopper and while still grasped by the gripper jaws, will fall down in the path of the oncoming signatures on the table or support. This causes said signature to be displaced and sometimes turned around, with obvious results. A further object of the invention is to provide means that will prevent such eventualities, and exercise complete control over the signature (whether it be large and wabbly or short and stiff) from the moment of its withdrawal from the hopper or signature source to the time it is deposited on the table or support, thus preventing any premature or improper engagement between the signature group and the deposited signature.

A further object resides in the provision of protective devices designed to stop the machine in the event of untoward happenings as, for example, the "bunching" of a signature on the table or support; the failure of the reciprocating conveyer to withdraw a signature group out of the path of the lugs on the main conveyer as said lugs pass down through the table or support; or the failure of a signature group to be removed laterally from the table, at the point where it is positioned to be fed into the rotary delivery, before the succeeding signature group reaches that point. These protective devices, which preferably open an electric circuit controlling the application of power from the prime mover, act to prevent breakages that would almost inevitably take place but for their presence.

In addition, the invention resides in certain novel and highly efficient means for removing the signature groups from the table or support, on which they lie flatwise, turning said groups and depositing them on their rear edges in a receptacle or trough. This latter, preferably, extends longitudinally of said table and is provided with means for progressing the signature groups edgewise in the same direction as that of their feed along the table or support.

Various other objects and advantages will hereinafter appear.

The invention will be better understood by reference to the accompanying drawings, illustrating one embodiment of the inventive idea, and wherein—

Figures 1 and 1ª are a side elevation, with various parts omitted, of part of an assembling or gathering machine and its delivery;

Fig. 2 is a transverse elevation showing certain parts of the gathering machine;

Fig. 3 is a detached perspective view of the switch mechanism, a tripper mounted on the conveyer chain, and intermediate mechanism whereby the former is operated by the latter;

Fig. 4 is a detail showing a tripper or pivoted member about to ride over one of the displaceable sections of the track or way;

Fig. 5 is a front elevation of one of the gripper devices and associated parts; and Fig. 6 is a side elevation corresponding to Fig. 5;

Fig. 7 is a detached perspective view showing part of the detecting mechanism;

Figs. 8 and 9 are details;

Fig. 10 is an end elevation showing the delivery mechanism and associated parts;

Fig. 11 is a perspective view showing certain features of the delivery mechanism;

Fig. 12 is a transverse section through said delivery, with various parts omitted;

Fig. 13 is a detail illustrating the electrical protective device at the delivery; and Fig. 14 is a plan view of the table or support, showing the various devices for controlling the feed of the signature from the hopper onto the table or support.

Figure 1:
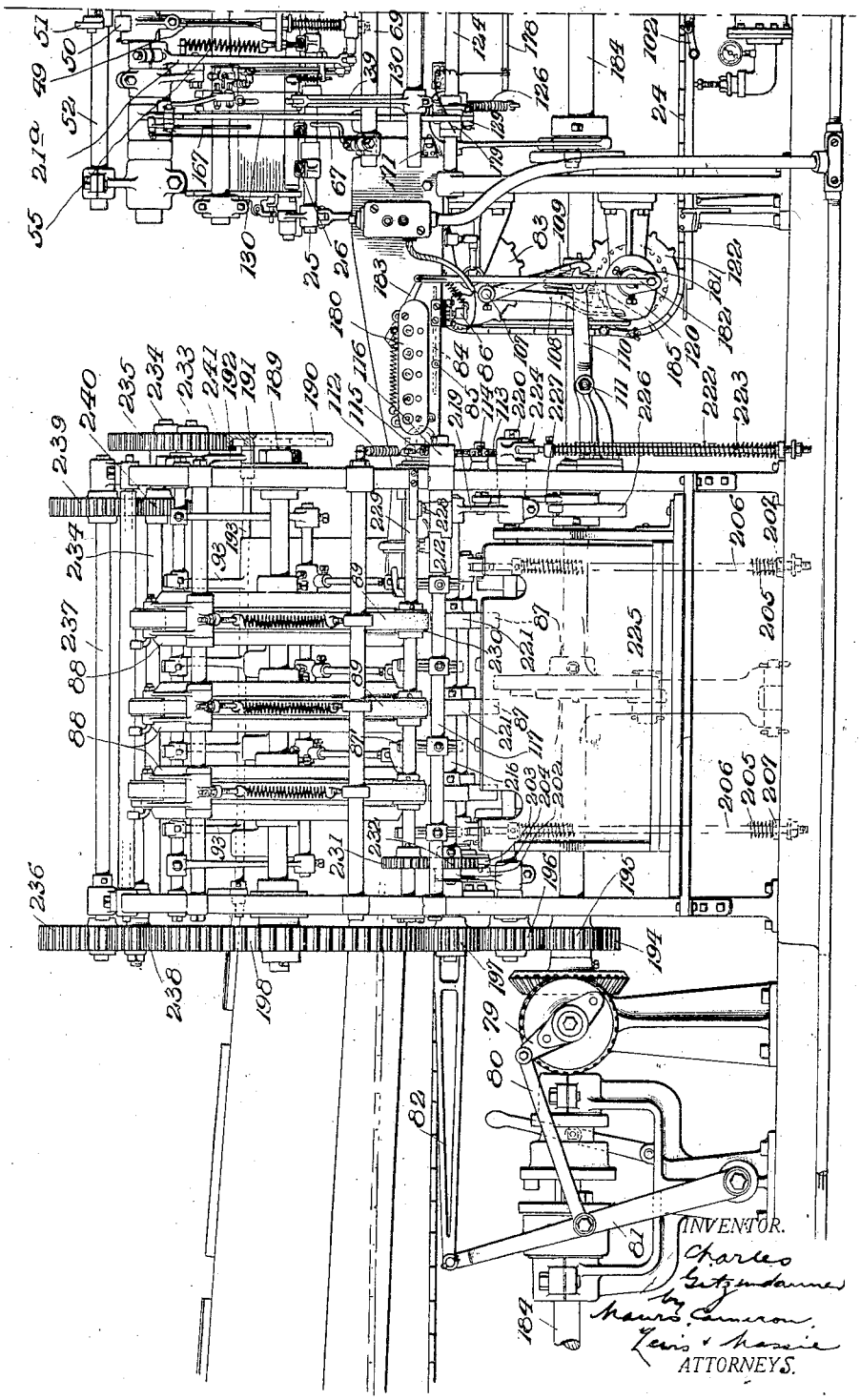

Referring to the drawings, and particularly Figs. 1ª and 2, there are shown a plurality of sources of signature supply in the form of hoppers 20 from which the lowermost signature in each hopper is simultaneously removed by suitable swinging grippers 21 and ultimately deposited on the table or support 22 along which they are progressed by lugs 23 mounted on the main conveyer chain 24. The folded edge of the signature to be withdrawn is bent down by a suitable swinging suction device comprising a pipe 25 provided with a series of suction orifices 26. The pipe communicates with a conduit 27 which in turn communicates with a casing 28 provided with a slide valve (not shown). A pipe 29 communicates with a suction tank 30, and said casing. The slide valve is actuated by cam 31 on cam shaft 32 by means of rod 33. Said pipe 25 receives its swinging movement from cam 34 on cam shaft 32 through rod 35 and arms 36 and 37 (Fig. 2).

As the folded edge of the signature is thus bent down, there is preferably introduced therebetween and the remainder of the pile of signatures a pair of fingers 38 which act to relieve said signature of the weight of the superimposed pile, and facilitate the withdrawal of the signature. These fingers are pivoted to arms 39 fixed to shaft 40 which latter is rocked by means of cam 41, mounted on cam shaft 32, acting through yoked rod 42 and arm 43.

The bent-down signature is withdrawn, as illustrated herein, by means of the swinging gripper device 21. Said device comprises two arms 21ª and 21ᵇ fixed upon the rock shaft 44 and spaced apart from each other. Upper gripper jaws 45 are shown fixed to and integral with the arms. Pivoted at 46 in the lower end of each arm are the movable lower jaws 47, said jaws having prolongations extending rearwardly from the pivot point 46 to form lever arms 47'. Journaled in the ends of these lever arms 47' is a cross-piece 48. A rod 49 passes through an orifice in the cross-piece 48 and at its upper end said rod is yoked or straddled about the rock shaft 44. Said rod 49 at its upper end carries a cam roller 50 which coöperates with the cams 51 and 51' (Fig. 1ª) on shaft 52. These cams are rotatably adjustable to compensate for wear and control the closing of the grippers to seize the bent-down signature and the opening of the grippers to release the signature after the latter has been withdrawn from the hopper. A shoulder 53 is formed on the rod or link 49 against which bears a cross-piece 54 to which are connected two springs 55 and 56. The upper ends of said springs are connected to bearings on the gripper arms and the lower ends of said springs are adjustably connected to the cross-piece 54. These springs serve to hold the cam roller 50 to its cam and also tend to open the grippers when allowed to do so by the cam.

A heavy spring 57 acts between the cross-piece 54 and part 48 to prevent slamming of the grippers as they open and close and to accommodate the bite of the grippers to signatures of different thicknesses. The lower end of rod 49 is preferably a separate piece 49' circular in cross-section so as to accommodate the heavy spring 57. Preferably, this piece 49' screws into the rod 49 and is held in place by a set-nut. A nut is preferably screwed on to the lower end of the rod 49' where the same projects through the cross-piece 48, in order to hold the bar in place. It may here be remarked that the rod 49 is depressed by the cam against the tension of springs 55 and 56 to move the lower gripper jaws toward the upper gripper jaws when a signature is to be seized, and that this motion is normally transmitted to said lower gripper jaws through the intermediary of said heavy spring 57 without normally compressing the same. If, however, the grippers seize a signature that is too thick, the spring 57 will be compressed and the rod 49' will be projected through cross-piece 48. There is thus provided a gripper device which will automatically, and without adjustment, withdraw signatures of any size and protect the parts, irrespective of the thickness of signatures that are being operated upon.

The shaft 52 is carried by arms 58 rigidly fixed to gripper shaft 44. Said shaft is oscillated by an eccentric 59 on cam shaft 32 through a link 60. This mechanism gives its oscillatory motion to the shaft 44 and to the gripper devices whereby they swing to and from the signature stack. The shaft 52 swings about the shaft 44 in harmony with the swinging movement of the gripper devices to keep the opening and closing cams in operative position relative to the cam roll 50 by reason of arms 58 being fixed to the shaft 44.

The shaft 52 also rotates in its bearings upon the arms 58 to secure relative movement between the cams 51 and 51' and the cam roller 50 so that the cams may act through the intervening mechanism to open and close the grippers. To secure this movement, there is provided a sprocket wheel 61 fixed to a sleeve 62 upon the gripper shaft 44, said sleeve being rotatable on said shaft. Fixed to sleeve 62 is a pinion 63. In mesh with the pinion 63 is a pinion 64 on shaft 52. A sprocket chain 65 passes over sprocket wheel 61 and over a sprocket wheel 65' fixed on cam shaft 32. It will thus be seen that the shaft 52 is rotatably driven from the shaft 32, the pinions 63 and 64 rolling on each other during the rocking of the shaft 52 about the shaft 44.

Heretofore the signatures, as they have been withdrawn from the hoppers, have been deposited on fingers 66 arranged longitudinally of the table or support, from which they were removed onto the table by the lugs 23 on the conveyer chain. It has, however, been experienced that, after the signature has been entirely removed from the hopper, with its folded edge still clamped in the gripper jaws, the corner of the open edges of the signature nearest the oncoming signature group on the table is liable to project down into the path of said group, notwithstanding the presence of fingers 66. This premature and improper engagement frequently resulted in the obstructing signature being displaced and sometimes turned partially around. This happened not only when large and wabbly signatures were being handled but also when small, short and comparatively stiff ones were being used. Accordingly, means for satisfactorily controlling the signature from the time of withdrawal to the moment it is deposited on the table or support, are provided. Referring to Fig. 14, 67 indicates two transverse rods that are here shown as carried by the side 22' of the table 22. These rods are arranged above fingers 66 and extend across the table. On these rods large wabbly signatures are deposited after being withdrawn from the hoppers. One such is shown in dotted lines. The signature is so supported as to prevent any part thereof getting in the way of the oncoming group. The signature is removed from these transverse rods 67 by the beaters 68 mounted on shaft 69 which latter is operated by cam 70 on cam shaft 32 through yoked rod 71. Said beaters deposit the signatures on the longitudinally disposed fingers 66 from which they are removed as heretofore described.

If a short, stiff signature is being handled, the same difficulty is encountered, the free end of the signature whipping down into the path of the oncoming signature group. For such signatures there is preferably provided controlling means in the form of a rod 72 arranged about midway of the hopper and projecting from the under side thereof outward over the table. Thus the free edge of the signature is supported and controlled until the signature is deposited flat on the fingers 66. Obviously more than one rod or member could be used, but one has been found quite sufficient.

The fingers 66, from which the signatures are removed onto the table or support, are secured to a cross rod 73 which is pivoted in the side piece of the table 22' and bracket 74 (Fig. 2). The signatures, as above indicated, are deposited on these fingers and are removed therefrom by the lugs 23 which engage the rear edges of the signatures on said fingers. The several signatures constituting a group are therefore carefully and exactly alined by this operation.

It sometimes happens that a signature will become balled up on the table and, when this occurs, it is desirable that the machine be stopped as promptly as possible so that the balled-up signature may be removed before a breakage occurs. In order to effect this prompt stoppage of the machine, the rod 73 on which the fingers 66 are mounted is provided with a downwardly projecting member 75 (Fig. 9) which carries a contact piece 76, the latter normally closing an electric circuit which controls the prime mover or motor (not shown). When the balled-up signature, passing along the table, engages the under side of said fingers, it elevates the same, rotates the rod on which the fingers are mounted, and moves the contact piece 76 to open the circuit, thus stopping the machine.

The continuous conveyer 24 provided with the lugs 23 that moves the groups of signatures along the table, delivers them to a reciprocating conveyer of any usual or well-known type. Preferably, this reciprocating conveyer comprises a reciprocating casting 77 on which the groups of signatures are deposited and which engages the under side of each group, and clamping members 78 that reciprocate with said casting and also move toward and from the book to clamp and unclamp the same. This reciprocating conveyer continues the movement of the groups of signatures along the table to a point where they are positioned for the operation of a delivery mechanism which carries the books away from the gathering machine. The reciprocation is effected from crank 79 (Fig. 1) operating through link 80, arm 81 and rod 82.

It is possible that the reciprocating conveyer may not remove one group of signatures from the range of influence of the continuous conveyer before another group of signatures has arrived at the end of the continuous conveyer and at the point where the lugs on the same pass downward through the table of the machine; that is to say, at the point where the chain 24 passes around sprocket wheel 83 (Figs. 1 and 3). Should this occur, it is obvious that, unless the machine is stopped, something will have to break, inasmuch as the lugs on the conveyer chain will act to firmly clamp the group of signatures against the table. There is accordingly provided, at this point, means for opening the electric circuit controlling the prime mover or motor, and as illustrated (Fig. 1), this means comprises a pivoted plate 84 which normally is arranged in line with the table and constitutes in effect a part thereof. Should a group of signatures be pressed against the table at this point by one of the lugs on the conveyer chain, said plate will be moved about its pivot 85 and the circuit will be opened by the movement of a contact piece 86 secured to the under side of said plate, and the machine stopped.

The reciprocating conveyer, after receiving the signature groups from the conveyer 24, progresses them to a positioning point on a continuation 22″ of table 22, where they are removed laterally from said table by the engagement with the under side of each group of lift rollers 87 (Fig. 12). These rollers press the groups into engagement with the large rotary wheels or members 88, mounted on an axis arranged longitudinally of the table or support, said wheels or rotary members being substantially tangent to the table. Normally the signature groups are thus fed in the path of the arrow (Fig. 12) past the upper face of switch member 87′, between said wheels 88 and belts 89, ultimately passing down between rollers 90 and 91 and being deposited on their rear edges in a receptacle or trough 92 which preferably extends longitudinally of the table or support 22′. Preferably there is arranged within the receptacle or trough 92 a movable or vibrating member 93 which operates to deposit succeeding signature groups on opposite sides of the receptacle or trough, thus preventing a succeeding signature group from being deposited on a preceding group. Preferably, a conveyer chain 94 provided with pushers 95 operates to feed the signature groups out of the machine or into a binding or other machine.

It may sometimes happen that a signature group that has been progressed by the reciprocating conveyer along table 22, and positioned at the point where it is to be removed laterally (as above described) will not be so removed before the succeeding group approaches the positioning point. The succeeding book thereupon engages the one that first reached the positioning point and, to prevent jamming and breakages, a protective device is provided to be operated when the first book is moved only a slight distance by the second book, this protective device operating to stop the machine. Preferably, this protective device is in the form of a lever or member 96 pivoted at 97 just beyond the normal position where the signature group is positioned by the reciprocating conveyer. This lever normally closes an electric circuit at terminal 98 which circuit controls the operation of the prime mover or motor, being held in this position by spring 99. Said terminal 98 is mounted on an arm 100 carried by the end 101 of the table 22. When, however, a signature group is engaged by a succeeding group and pushed along the table, the lever 96 is rocked on its pivot, against the tension of spring 99, the circuit is broken at 98, and the machine is stopped.

As is well known to those skilled in the art, it sometimes happens that a signature will not be fed from the signature source or hopper; or that too many signatures or an imperfect signature will be fed. Obviously, in any of these cases the signature group into which the defective signature or too many signatures entered, or which was short one or more signatures, would be defective; and, like Dexter, King and Juengst, I provide detecting means for switching out, or separating, the defective group from the perfect books.

To effect this switching out or separating there is preferably provided on the side of the continuous conveyer a plurality of pivoted members or elements 102 (Figs. 1, 3 and 4) which are hereinafter designated as "stops" or "trippers." One such stop or tripper is preferably pivoted at 103 a short distance to the rear of each pair of lugs 23 on the continuous conveyer 24. The free end of each stop or tripper rides on a track or way 104 arranged longitudinally of and alongside the main conveyer, and is preferably provided with a roller 105. The track or way 104 is provided with a plurality of displaceable sections or trap-doors 106, one for each signature source or hopper, said trap-doors being normally flush with the surface of the track or way. Should a defective signature, or too many signatures, be gripped, or should the grippers fail to take a signature, the trap-door 106 associated with the hopper where the defect occurred is automatically opened (by means hereinafter described) and the roller 105 passes through said section or trap-door and is moved toward the delivery end of the machine beneath said track or way. The latter is provided with a vertical or depending portion 104', in juxtaposition to which is mounted a short shaft 107 from which depends two arms 108 and 109. The arm 108 is disposed close to said track portion 104' and is engaged and moved by a roller as it passes downwardly in engagement with the inner side of said track. This accordingly swings the arm 109 out of engagement with the notched end of lever 110, whereupon said lever is swung on its pivot 111 by means of spring 112, acting through sprocket chain 113 which is secured to the other arm of said lever 110 and passes over sprocket wheel 114. One end of spring 112 is anchored to the machine frame and the other end is secured to an arm 115 carried by sleeve 116 keyed on shaft 117 on which the switches or separating members 87' are mounted. These members are accordingly swung upwardly by said spring and the defective groups, instead of following the path of the arrow in Fig. 12, will pass along the under surface of the switch and out of the machine.

In order to readily and certainly effect the disengagement of arm 109 and lever 110, the notched end 118 of the latter carries a roller 119 that engages a cam 120 carried by shaft 121 which drives the conveyer 24 through sprocket 122. Thus the lever 110 is periodically rocked by said cam whereby the tension of spring 112 is removed so that, should a roller be in the "set" or operative position, the slightest engagement of the roller with arm 108 would swing arm 109 out of engagement with lever 110. This cam also resets the lever 110 after the passage of a roller 105.

The opening of the displaceable sections or trap-doors 106 to permit the stops or trippers 102 to be "set" is effected from detecting mechanism carried by the swinging gripper arm 21$^b$. The section or trap-door 106 is carried on a stirrup 123 (Figs. 1, 2 and 3) which straddles shaft 124. Said stirrup is positioned on said shaft by set-collars 125. The sections or doors are normally held in the inoperative position shown in Fig. 3 by spring 126, one end of which is anchored to the machine-frame and the other end secured to a curved arm 127 which is pivoted to said stirrup at 128. An arm 129 projects from said stirrup to which is secured the lower end of rod 130, the upper end of which is pivoted in the end of arm 131 carried by a sleeve 132 loosely mounted on shaft 44. A companion sleeve 133, also loose on shaft 44, carries an arm 134, said arms being adjustable toward and from each other by the bolt and slot connection 135 (Fig. 6). Arm 134 carries abutments 136 and 137, preferably of the knife-edge variety shown (Figs. 7 and 8), mounted on rotatable studs 136' and 137', these abutments being rotated to increase or diminish the distance therebetween. Gripper arm 21$^b$ (Fig. 6) carries a stud 138 on which is pivoted a detector arm 139 provided with a contact piece 140 projecting laterally therefrom and being held in the end of said arm by a screw 141. This contact piece is preferably notched at 141' along its engaging edge.

During the normal operation of the device, that is to say, when signatures of the desired thickness are being withdrawn, said contact piece will pass between said abutments; but, should no signature be seized by the gripper, or one that is too thin, the abutment 136 will be engaged by the contact piece. Should more than one signature be seized, or one that is too thick, the lower abutment will be engaged. The engagement of either of the abutments, as the gripper swings away from the hopper, acts to swing the arm 134 and, through the connections described, opens the section or trap-door 106 associated with that particular gripper, with the result, as heretofore stated, that a stop or tripper is "set."

The movement of the detector arm 139 is effected by means of a bell-crank lever pivoted on the gripper arm 21$^b$ at 142. Said lever is rocked on its pivot from the movable jaw 47, a lug 143 on said jaw engaging an adjustable lug 144 on the short arm 145 of said lever. The long arm 146 of said lever carries in its upper end a screw 147 passing through a nut 148. The end of this screw engages a lug 149 on an intermediate member 150 also pivoted on stud 138. Said screw 147 and lug 149 are held in contact by spring 151, one end of which is anchored to pin 152 on said lever and the other end to an ear 153 on said member. The detector arm 139 is moved by said lever through said intermediate member, by means of a spring 154, one end of which is anchored to pin 155 on said member and the other end to a pin 156 on said arm 139. A plate 157, also mounted on stud 138, carries a pair of posts 158 and 159 which limit the movement of the detector arm 139. In the inoperative position of the parts, the detector arm 139 contacts the lower post 159 and the bell-crank lever is rocked to move it toward the post 158 through spring 154. Normally the detector arm is moved only a sufficient distance so that the contact piece 140 will pass through abutments 136 and 137; but, if no signature is seized or one that is too thin, the detector arm will be moved so that abutment 136 will be engaged. Should it happen that, after the detector arm has been moved into contact with the upper post 158, the bell-crank lever continues to rock on its pivot, it will be observed that the intermediate member 150 will continue to move on its pivot and that the excess movement will be absorbed by the spring 154 which will simply be distended. There is thus provided a protective connection between the bell-crank lever and the detector arm which will prevent breakage of the parts that would otherwise almost inevitably occur; and also a connection such that only a limited movement of the detector arm is necessary to cover any range of movement of said bell-crank lever.

As above stated, the bell-crank lever is rocked in one direction (that is the direction in which the detector arm is moved out of engagement with the lower post 159) from the movable jaw 47. It is rocked in the other direction by a spring 161 encircling a pin 162, one end of which is pivoted at 163 to the long arm 146 of the lever, and the other end of which projects freely through a lug 164 on gripper arm 21ᵇ. The spring reacts between the head of said pin and said lug and tends to rotate said lever toward the left (Fig. 6). The intermediate member 150 is provided with a laterally-extending lug 165 which overlies the detector arm and engages its upper surface at 139′. When, therefore, the spring 161 is free to operate, it rocks member 150 on its pivot and, through the engagement of said lug, forces detector arm 139 back into contact with post 159.

The arms of the bell-crank lever are proportioned so that the movement of the small arm is multiplied the desired number of times in the long arm of the lever, preferably 40 to 1 or thereabout. For any predetermined thickness of signature, the said lever is adjusted to cause the contact piece 140 to normally pass between the abutments 136 and 137. This adjustment may be effected by the lugs 143 and 144 or by the screw 147; but preferably I prefer to use both of these adjusting means, moving the lugs 143 and 144 to secure the adjustment roughly and then operating the screw 147 to secure the finer adjustment. The screw 147 is held in its adjusted position by the nut 166 (Fig. 6).

It will be understood from the foregoing that if a signature that is too thick is seized, the lug 143 will not engage lug 144 (as it normally does) and, accordingly, the detector arm will remain in its original position; that is to say, in a position in which the contact piece 140 will engage the lower abutment 137 as the gripper swings away from the hopper.

Preferably, a visual signal is provided to indicate the hopper at which the defect occurred. Such a signal 167 (Fig. 6) is shown pivoted to arm 131 at 168, this signal being provided with an arm 169 that is connected to the upper end of a rod or wire 170, the lower end of which is anchored or secured to the frame of the machine at 171 (Fig. 1). Accordingly, when the arm 131 is swung upwardly, as heretofore described, the signal 167 will be swung likewise (in the direction of the arrow, Fig. 6).

The signal is automatically restored to its normal position at the time the trap-door is closed, by the downward movement of rod 130 (Fig. 6), this being effected (during the movement of the gripper toward the hopper) by the engagement of a lug 171 (Fig. 5), carried by sleeve 172 fixed to the gripper shaft 44, with a lug 173 carried by sleeve 132 that carries arm 131.

An audible signal is also preferably provided to advise the attendant that a defect has been discovered. Preferably, an ordinary bell 174 (Fig. 1ᵃ), connected to battery 175, is employed. One wire 176 is grounded on the metal frame of the machine and the other wire 177 is electrically connected to a metal rod 178 that runs the entire length of the gathering machine, being suitably insulated therefrom. A stiff wire 179 leads from the rod 178 and projects over the arm 129 (Fig. 3). As this arm is swung, when the rod 130 is elevated, it contacts with wire 179, thus completing the circuit through the bell and battery and sounding the signal. When the rod 130 is lowered, the arm 129 moves out of contact with wire 179, the circuit is broken, and the alarm is stilled. It will thus be seen that the opening of a trap-door 106, the display of the visual signal 167, and the sounding of the audible alarm are practically instantaneous; and that the return of the trap-door and the visual signal to their normal positions, and the opening of the circuit through the bell are also practically instantaneous—these several operations being effected through rod 130 and connected parts.

Preferably an indicator 180, of any usual or suitable type, is positioned at the point where the conveyer chain 24 passes downwardly through the table or support, to indicate the number of groups of signatures that have been gathered. This indicator is preferably operated from shaft 121 through crank-arm 181, link 182, and arm 183. The indicator is operated each time a pair of the lugs 23 passes a given point.

Shaft 121 is driven from main shaft 184 (Figs. 2 and 3) through a spiral gear connection 185. Cam shaft 32 is driven from main shaft 184 through gear 186 on said shaft, pinion 187 and gear 188 on said cam shaft. Said main shaft is driven by any suitable prime mover, preferably an electric motor (not shown), the operation of said motor being controlled by the several protective devices heretofore described.

Referring particularly to Figs. 1, 10, 11 and 12, illustrating the rotary delivery that receives the signature group flatwise and deposits them on their edges in the receptacle or chute 92, it is pointed out that a plurality preferably three, rotary members or wheels are employed, said wheels being mounted on shaft 189. This shaft carries an internal cam 190 (Figs. 1 and 11) that operates, through rod 191 and arm 192, to oscillate shaft 193 carrying the members 93 in the receptacle or chute.

Shaft 189 is driven from main shaft 184 (Fig. 10) through gear 194 on said main shaft and pinions 195, 196 and 197 which latter meshes with a gear 198 on shaft 189. Gear 197 is mounted on shaft 199 that drives the shaft 199' that carries lift-rollers 87 (Figs. 11 and 12) that engage the under side of the signature groups to feed them laterally from table 22. Shaft 199' rotates in arms 200 carried by shaft 201. In order that shaft 199' may be positively driven and at the same time elevated and depressed, a disk driving coupling of well known construction is employed. This coupling is composed of three disks, the first 202 being carried by shaft 199; the second 203 by shaft 199'; and the third disk 204 is a floating disk carried between the other two. Disk 202 is provided with a groove across its inner face as is disk 203, though the groove in the latter is at right angles to that in the former. Disk 204 is provided with ribs that engage said grooves. Such a coupling permits of the raising and lowering of shaft 199', while at the same time permitting the same to be positively driven. Said shaft 199' is elevated by springs 205 encircling rods 206 which latter are secured to said shaft. The lower ends of said springs react against plates 207 through which said rods freely pass. Said shaft is depressed by a cam 208 on main shaft 184, operating through yoked rod 209 and lever 210, pivoted at 211, and connected to shaft 199'.

The switches or separating members 87' (Figs. 3, 11 and 12) are mounted on shaft 117, as heretofore described. Said shaft carries a collar 212 (Fig. 3) provided with a hook 213 that engages a finger 214 carried by a bearing sleeve 215 in which is mounted one end of shaft 216. The other end of said shaft is mounted in bearing sleeve 217. These bearing sleeves 215 and 217 are carried by arms 218 and 219 mounted on shaft 220. Shaft 216 carries rollers 221 which are moved forward into engagement with lift-rollers 87 when shaft 117 (Figs. 3 and 11) is rocked to move switch members 87. The rocking of shaft 117 disengages hook 213 from finger 214 whereupon said shaft 216 is swung forward by spring 222 encircling rod 223, the upper end of which is carried in the free end of arm 224 keyed to shaft 220. The defective signature group passes between lift-rollers 87 and rollers 221, the latter, in view of their engagement with rollers 87, exercising a control over the unbound signatures so that they will be deposited in good order in the delivery box 225 (Fig. 10).

The rollers are moved back to the position shown in Fig. 3 by a cam 226, mounted on main shaft 184, operating on a yoked rod 227 connected to arm 219. The engagement of hook 213 with finger 214 is rendered certain by means of spring 228 (Fig. 3) bearing on hook 213. Said cam 226 not only restores the parts, as stated, but the normal action of the same in periodically rocking shaft 216, makes it possible for the comparatively light spring 112 to disengage the finger 213 against the tension of the heavier spring 223.

Shaft 216 is rotated from shaft 229 which carries belt pulleys 230 around which belts 89 pass, shaft 229 having a pinion 231 keyed thereto that meshes with pinion 232 on shaft 216.

Belts 89 pass around rollers 90 and 91 (Fig. 12) as heretofore stated. These rollers are mounted on shafts 233 and 234, respectively, and these shafts are positively driven. Shaft 234 is driven from shaft 237, a gear 239 on shaft 237 meshing with a pinion 240 on shaft 234. A gear 235 on shaft 234 meshes with a gear 241 on shaft 233.

While, for the purpose of clearness, one expression of the inventive idea has been herein shown and described in considerable detail, it is to be understood that the invention is not so limited, and that the inventive idea is susceptible of various embodiments within the limits of the appended claims.

What is claimed is:—

1. In a device of the character described, a support, means for assembling signatures from a plurality of sources of signature supply including a conveyer that progresses the signatures along said support, a plurality of pivoted elements carried by said conveyer, a track or way provided with displaceable sections over which said pivoted elements normally ride, one section being associated with each source of signature supply, detecting means associated with each source of signature supply for displacing its corresponding section to permit one of said elements to drop through said track, and a member operated by said dropped element.

2. In a device of the character described, a support, means for assembling signatures from a plurality of sources of signature supply including a conveyer that progresses the signatures along said support, a plurality of elements carried by said conveyer, a track or way over which said elements normally ride, and detecting means associated with each source of signature supply and operable to move one of said elements to the underside of said track, and a member operated by said moved element.

3. In a device of the character described, a table, an endless conveyer for moving signatures therealong, a plurality of pivoted elements carried by said conveyer, a track provided with displaceable sections over which said pivoted elements normally ride, means for displacing one of said sections to permit said pivoted element to drop through said track, and a member operated by said dropped element.

4. In a device of the character described, a support, means for assembling signatures from a plurality of sources of signature supply including a conveyer that progresses the signatures along said support, a plurality of elements carried by said conveyer, a track arranged longitudinally of said conveyer on which said elements normally ride, means at each source of signature supply for moving one of said elements to the underside of said track, and a member operated by said moved element.

5. In a device of the character described, a swinging gripper arm, a jaw pivoted thereto, a bell-crank lever pivoted on said gripper arm, an arm pivoted on said gripper arm and operated by said bell-crank lever, means moving said lever on its pivot from said pivoted jaw, and a member movable by said arm.

6. In a device of the character described, a swinging gripper arm, a jaw pivoted thereto, a bell-crank lever pivoted on said gripper arm, an arm pivoted on said gripper arm and adapted to be moved by said lever, and adjusting means at each arm of said lever for moving the same on its pivot in accordance with the thickness of signature to be seized by the gripper arm.

7. In a device of the character described, a swinging gripper arm, a jaw pivoted thereto, a bell-crank lever pivoted on said gripper arm, an arm pivoted on said gripper arm and operated by said bell-crank lever, means moving said lever on its pivot from said pivoted jaw, means for adjusting the extent of movement of said lever, and a member movable by said arm.

8. In a device of the character described, a swinging gripper arm, a jaw pivoted thereto, a bell-crank lever pivoted on said gripper arm, a detector arm pivoted thereon, a member intermediate said lever and arm whereby the movement of the former is transmitted to the latter, a yielding connection between said member and arm, and a device adapted to be operated by engagement with said arm.

9. In a device of the character described, a swinging gripper arm, a jaw pivoted thereto, a bell-crank lever pivoted on said gripper arm, a detector arm pivoted thereon, a member intermediate said lever and arm whereby the movement of the former is transmitted to the latter, a yielding connection between said member and arm, a spring holding said lever in engagement with said intermediate member, and a device adapted to be operated by engagement with said arm.

10. In a device of the character described, a swinging gripper arm, a jaw pivoted thereto, a bell-crank lever pivoted on said arm, an arm pivoted on said gripper arm, a yielding connection between said bell-crank lever and pivoted arm, and a member movable by said pivoted arm in either of two positions.

11. In a device of the character described, the combination of a gripper arm, a jaw pivoted thereto, a bell-crank lever pivoted on said gripper arm, means associated with said pivoted jaw for moving said lever on its pivot, an arm pivoted on said gripper arm and adapted to be moved by said bell-crank lever, and a member movable by said pivoted arm in either of two positions.

12. In a device of the character described, the combination of a gripper arm, a jaw pivoted thereto, a bell-crank lever pivoted on said gripper arm, means associated with said pivoted jaw for moving said lever on its pivot, an arm pivoted on said gripper arm and adapted to be moved by said bell-crank lever, a member movable by said pivoted arm in either of two positions, and means for limiting the movement of said pivoted arm irrespective of the extent of movement of said lever.

13. In a device of the character described, a gripper arm, a jaw pivoted thereto, a bell-crank lever pivoted to said gripper arm, means for moving said bell-crank lever on its said pivot in one direction from said jaw, yielding means for moving said lever in the opposite direction, an arm pivoted on said gripper and movable by said lever, and a device adapted to be operated by said arm in one of two positions.

14. In combination, a gripper arm, a bell-crank lever pivoted thereon, a movable jaw pivoted to said gripper arm, means for rocking said lever on its pivot from said movable jaw, a detector arm moved by said lever, and devices to limit the movement of said arm under abnormal conditions irrespective of the extent of movement of said bell-crank lever on its pivot.

15. In combination, a gripper arm, a bell-crank lever pivoted thereon, a movable jaw pivoted to said gripper arm, means for rocking said lever on its pivot from said movable jaw, a detector arm moved by said lever, a lost-motion connection between said bell-crank lever and arm, and devices to limit the movement of said arm under abnormal conditions irrespective of the extent of movement of said bell-crank lever on its pivot.

16. In combination, a gripper arm, a bell-crank lever pivoted thereon, a movable jaw pivoted to said gripper arm, means for rocking said lever on its pivot from said movable jaw, a detector arm moved by said lever, a spring connection between said bell-crank lever and arm, and devices to limit the movement of said arm under abnormal conditions irrespective of the extent of movement of said bell-crank lever on its pivot.

17. In a device of the character described, a gripper arm, a shaft on which the same is mounted, a sleeve loose on said shaft, a pair of rotatable abutments carried by said sleeve, means for varying the distance apart of said abutments, and means for rotating said sleeve through said abutments.

18. In a device of the character described, a gripper arm, a shaft on which the same is mounted, a sleeve loose on said shaft, a pair of rotatable abutments carried by said sleeve, means for varying the distance apart of said abutments, and means carried by said gripper arm for rotating said sleeve by engagement with either of said abutments.

19. In combination, an oscillating shaft, grippers carried thereby, a visual signal connected to said grippers, a support provided with doors, means for automatically opening one of said doors under abnormal conditions and setting said signal, and means for automatically and simultaneously restoring said signal and closing said door.

20. In combination, a support provided with displaceable sections, a visual signal associated with each section, means for automatically displacing one of said sections under abnormal conditions and setting said signal, and means for automatically and simultaneously restoring said signal and closing said section.

21. In combination, an oscillating shaft, grippers carried thereby, a visual signal connected to said grippers, a support provided with doors, means for automatically opening one of said doors under abnormal conditions and setting said signal, and means controlled by said oscillating shaft for automatically and simultaneously restoring said signal and closing said door.

22. In combination, a support provided with displaceable sections, a bell included in a circuit adapted to be closed at each of said sections, means for automatically displacing one of said sections under abnormal conditions and ringing said bell, and means for automatically and simultaneously closing said section and opening said circuit.

23. In combination, a support provided with displaceable sections, a bell included in a circuit adapted to be closed at each of said sections, a visual signal associated with each section, means for automatically displacing one of said sections under abnormal conditions, setting said visual signal and ringing said bell, and means for automatically and simultaneously closing said section, restoring said visual signal and opening said circuit.

24. In combination, a hopper, a table along which signatures are progressed in a flatwise position, means for withdrawing signatures from said hopper, a pair of rods arranged transversely of said table beneath said hopper adapted to support the signatures, a plurality of fingers arranged longitudinally of and above said table, means for removing the signatures from said rods onto said fingers, a conveyer and lugs mounted thereon and engaging said signatures on said fingers and removing the same therefrom onto said table.

25. In combination, a hopper, a table along which signatures are progressed in a flatwise position, means for withdrawing signatures from said hopper, a rod projecting from beneath said hopper transversely over said table and adapted to support the edge of the signature last removed from said hopper, a plurality of fingers arranged longitudinally of and above said table on which the signatures are deposited, a conveyer and lugs mounted thereon and engaging said signatures on said fingers and removing the same therefrom onto said table.

26. In combination, a table along which signatures are progressed in a flatwise position, a conveyer for progressing said signatures, lugs mounted on said conveyer and adapted to engage the rear edge of said signatures, supporting fingers yieldingly mounted above said table on which the signatures are deposited and from which they are removed by said lugs, means connected with said fingers for normally closing an electric circuit through the prime mover, said means being operated to break said circuit and stop the machine when said fingers are moved vertically.

27. In combination, a table along which signatures are progressed in a flatwise position, a conveyer for progressing said signatures, lugs mounted on said conveyer and adapted to engage the rear edge of said signatures, a pivoted rod transversely arranged above said table, supporting fingers on which the signatures are deposited extending longitudinally of said table and carried by said rod and from which they are removed by said lugs, an arm projecting downwardly from said rod and normally closing an electric circuit through the prime mover of the machine, said circuit being opened to stop the machine when said fingers are moved vertically.

28. In a device of the character described, a table, an endless conveyer for moving signatures therealong, a reciprocating conveyer receiving the signatures from said endless conveyer, a movable plate positioned at the point where said endless conveyer travels downward through the table, an electric circuit controlling the operation of the machine, and means connected to said plate for opening said circuit to stop the machine.

29. In a device of the character described, a table, an endless conveyer for moving signatures therealong, a reciprocating conveyer receiving the signatures from said endless conveyer, a movable plate positioned at the point where said endless conveyer travels downward through the table and normally constituting part of said table, an electric circuit controlling the operation of the machine, and means connected to said plate for opening said circuit to stop the machine.

30. In a device of the character described, a table, an endless conveyer for moving signatures therealong, a reciprocating conveyer receiving the signatures from said endless conveyer, a movable element positioned at the point where said endless conveyer travels downward through the table and normally constituting part of said table, an electric circuit including said plate controlling the operation of the machine, and lugs carried by said conveyer adapted to move said element to open said circuit and stop the machine.

31. In a device of the character described, a table, a rotary delivery, a reciprocating conveyer for moving groups of signatures along said table and positioning them for introduction into said delivery, an electric circuit controlling the operation of the machine, and a movable member located adjacent to and slightly beyond the point where said groups of signatures are positioned by said conveyer, said member being moved to stop the machine by the contacting of a second group of signatures on said table with said positioned group.

32. In a device of the character described, a table, a rotary delivery, a reciprocating conveyer for moving groups of signatures along said table and positioning them for introduction into said delivery, an electric circuit controlling the operation of the machine, and a pivoted member located adjacent to and slightly beyond the point where said groups of signatures are positioned by said conveyer, said member being moved to stop the machine by the contacting of a second group of signatures on said table with said positioned group.

33. In combination, a support, a conveyer for moving signatures along and positioning them on said support flatwise, rotary means seizing said signatures and depositing them on their folded edges the line of each group when so deposited being in line with their movement along said support.

34. In combination, a support, a conveyer for moving signatures along and positioning them on said support flatwise, rotary means seizing said signatures and depositing them on their folded edges the line of each group when so deposited being in line with their movement along said support, and means for moving said group so deposited on their folded edges in line with the movement of said conveyer.

35. In combination, a support, a conveyer for moving signatures along and positioning them on said support flatwise, a rotary member arranged at the end of said support adapted to turn the book from its flatwise position and deposit the same on its rear edge, and a guide-way parallel with said support adapted to receive said book.

36. In combination, a support, a conveyer for moving signatures along and positioning them on said support flatwise, a rotary member arranged at the end of said support and above the same with its axis in line with said support adapted to turn the book from its flatwise position and deposit the same on its rear edge, and a guide-way parallel with said support adapted to receive said book.

37. In combination, a support, a conveyer for moving signatures along and positioning them on said support flatwise, a rotary member arranged at the end of said support above the same and substantially tangent thereto adapted to turn the book from its flatwise position and deposit the same on its rear edge, and a guide-way parallel with said support adapted to receive said book.

38. In a device of the character described, the combination of a support, a conveyer moving groups of signatures along said support and positioning the same for delivery, a wheel arranged above said positioning point and rotating on an axis disposed longitudinally of said support, tapes passing around said wheel, means for moving said groups of signatures laterally from said table between said wheel and tapes, a trough or guide-way into which each group of signatures is deposited on their folded edges, and means for feeding said groups of signatures along said trough.

39. In a device of the character described, the combination of a support, a conveyer moving groups of signatures along said support and positioning the same for delivery, a member arranged above said positioning point and rotating on an axis disposed longitudinally of said support, tapes passing around said member, means for moving said groups of signatures laterally from said table between said member and tapes, a trough or guide-way into which each group of signatures is deposited on their folded edges, and means for feeding said groups of signatures along said trough.

40. In a device of the character described, the combination of a table, a conveyer moving groups of signatures along said table and positioning the same for delivery, a member arranged above said positioning point and rotating on an axis disposed longitudinally of said table, tapes passing around said member, a second member arranged below said positioning point, means for elevating the same into engagement with the under side of each group of signatures and feeding the same laterally from said table between said tapes and said first member, and a receptacle into which each group of signatures is deposited on their folded edges.

41. In a device of the character described, the combination of a table, a conveyer moving groups of signatures along said table and positioning the same for delivery, a member arranged above said positioning point and rotating on an axis disposed longitudinally of said table, tapes passing around said member, a second rotating member arranged below said positioning point, means for elevating the same into engagement with the under side of each group of signatures and feeding the same laterally from said table between said tapes and said first member, and a receptacle into which each group of signatures is deposited on their folded edges.

42. In a device of the character described, the combination of a table, a conveyer moving groups of signatures along said table and positioning the same for delivery, a member arranged above said positioning point and rotating on an axis disposed longitudinally of said table, tapes passing around said member, a second member arranged below said positioning point, means for elevating the same into engagement with the under side of each group of signatures and feeding the same laterally from said table between said tapes and said first member, and a receptacle into which each group of signatures is deposited on their folded edges, said receptacle being disposed in line with said table.

43. In a device of the character described, the combination of a table, a conveyer moving groups of signatures along said table and positioning the same for delivery, a member arranged above said positioning point and rotating on an axis disposed longitudinally of said table, tapes passing around said member, a second member arranged below said positioning point, means for elevating the same into engagement with the under side of each group of signatures and feeding the same laterally from said table between said tapes and said first member, a receptacle into which each group of signatures is deposited on their folded edges, said receptacle being disposed in line with said table, and means for feeding groups of signatures along said receptacle.

44. In a device of the character described, the combination of a table, a conveyer moving groups of signatures along said table and positioning the same for delivery, a member arranged above said positioning point and rotating on an axis disposed longitudinally of said table, tapes passing around said member, a second member arranged below said positioning point, means for elevating the same into engagement with the under side of each group of signatures and feeding the same laterally from said table between said tapes and said first member, a receptacle into which each group of signatures is deposited on their folded edges, and a movable member disposed in said receptacle whereby succeeding books are deposited on opposite sides of the receptacle.

45. In combination, a support, means for assembling signatures and moving them flatwise along said support, a receptacle, rotary means associated with said support receiving said signatures flatwise and depositing them on edge in said receptacle, and a movable member disposed in said receptacle whereby succeeding books are deposited on opposite sides of said receptacle.

46. In combination, a support, means for assembling signatures and moving them flatwise along said support, a receptacle, rotary means associated with said support receiving said signatures flatwise and depositing them on edge in said receptacle, and a pivoted member disposed in said receptacle whereby succeeding books are deposited on opposite sides of said receptacle.

47. In combination, a support, means for assembling signatures and moving them flatwise along said support, a receptacle, rotary means associated with said support receiving said signatures flatwise and depositing them on edge in said receptacle, and a vibrating member disposed in said receptacle whereby succeeding books are deposited on opposite sides of said receptacle.

48. In a device of the character described, the combination of a rotating wheel around which groups of signatures are adapted to be fed, rollers arranged beneath said wheel, means for elevating said rollers into engagement with each group of signatures, a switch associated with said wheel and controlling the path of movement of said groups, means for moving said switch, and a second set of rollers movable with said switch.

49. In a delivery mechanism for groups of signatures, the combination of a rotating wheel, endless tapes passing around the same, rollers arranged beneath said wheel, means for elevating said rollers into engagement with each group of signatures, a switch associated with said wheel the position of which determines whether the groups shall pass above or below said switch, means for moving said switch, and a second set of rollers movable with said switch into engagement with said first set of rollers when the group is to pass below said switch.

50. In combination, a support along which signatures are progressed provided with a plurality of movable sections, a bell included in a circuit adapted to be closed at each of said sections, a visual signal associated with each section, means for automatically setting said visual signal and ringing said bell when a section is moved, and means for restoring said visual signal and opening said circuit.

51. In combination, a support along which signatures are progressed provided with a plurality of movable sections, a bell included in a circuit adapted to be closed at each of said sections, a visual signal associated with each section, means for automatically setting said visual signal and ringing said bell when a section is moved, and means for automatically and simultaneously restoring said visual signal and opening said circuit.

In testimony whereof I have signed this specification.

CHARLES GITZENDANNER.